United States Patent
Matsunaga et al.

[11] Patent Number: 5,958,333
[45] Date of Patent: Sep. 28, 1999

[54] TIN-SILVER-BASED SOLDERING ALLOY

[75] Inventors: Junichi Matsunaga; Ryuji Ninomiya, both of Tokyo, Japan

[73] Assignee: Mitsui Mining & Smelting Co., Ltd., Tokyo, Japan

[21] Appl. No.: 08/911,673

[22] Filed: Aug. 15, 1997

[30] Foreign Application Priority Data

Aug. 29, 1996 [JP] Japan ................................ 8-247197

[51] Int. Cl.$^6$ .................................................. C22C 13/02
[52] U.S. Cl. ............................. 420/562; 420/557; 148/22
[58] Field of Search ..................... 148/400, 22; 420/557, 420/562

[56] References Cited

U.S. PATENT DOCUMENTS

| | | | |
|---|---|---|---|
| 5,256,370 | 10/1993 | Slattery et al. | 420/557 |
| 5,328,660 | 7/1994 | Gonya et al. | 420/562 |
| 5,520,752 | 5/1996 | Lucey et al. | 148/400 |
| 5,658,528 | 8/1997 | Ninomiya et al. | 420/562 |

FOREIGN PATENT DOCUMENTS 8-187590   7/1996   Japan .

*Primary Examiner*—John Sheehan
*Attorney, Agent, or Firm*—Flynn, Thiel, Boutell & Tanis, P.C.

[57] ABSTRACT

The present invention provides a soldering alloy which does not include harmful Pb or Cd and which has an excellent tensile strength, elongation value, and melting point property. The soldering alloy according to the present invention can thus solve the conventional environmental problems, set the soldering temperature at a low level to thereby restrict the thermal damage to a soldered portion, and prevent breaking of the soldering alloy due to a heat cycle, with an excellent tensile strength and elongation value. A tin-silver-based soldering alloy according to the present invention consist essentially of 3 to 4% by weight of Ag, 2 to 6% by weight of Bi, 2 to 6% by weight of In, and the balance being Sn.

10 Claims, No Drawings

TIN-SILVER-BASED SOLDERING ALLOY

BACKGROUND OF THE INVENTION a) Field of the Invention

The present invention relates to a tin-silver-based soldering alloy and, more particularly, to a soldering alloy having a fusing property equivalent to or higher than that of "Alloy H" and which has excellent mechanical properties such as tensile strength and elongation value.

b) Description of the Prior Art

Conventionally, an alloy having an eutectic composition near Pb-Sn has been known as a typical soldering alloy. Further, an alloy made of Zn—Cd having a higher strength than that of Pb—Sn eutectic soldering alloy has also been known. However, the former soldering alloy has a problem of toxicity of lead and the latter soldering alloy has a problem of an adverse effect of cadmium evaporation to an operator. Therefore, neither has solved these recent environmental problems.

Under the above circumstances, various types of silver-tin-based soldering alloys containing no harmful Pb or Cd have been proposed. For example, "Alloy H" (manufactured by Nippon Alpha Metals Co., Ltd.) comprising Ag 2.0%, Cu 0.5%, Bi 7.5%, and Sn as the remainder, is known. Alloy H has a melting point which is higher than that of the Pb—Sn eutectic solder and lower than that of the conventional silver-tin-based soldering alloy containing no Pb or Cd, i.e., 212° C., and thus has excellent fusing properties. However, Alloy H has a low elongation value in a tensile test. Accordingly, there has been the risk that, when a heat cycle is applied to a soldered portion, it is not possible to absorb the thermal expansion difference between a substrate and a part so that the soldered portion might be broken.

The inventors of the present invention made various investigations on a soldering alloy which does not include harmful Pb or Cd and which is excellent in tensile strength and elongation value. As a result, the inventors made the invention disclosed in Japanese Patent Application Laid-Open No. 8-187590. The invention described in Japanese Patent Application Laid-Open No. 8-187590 provides a soldering alloy which has a tensile strength and an elongation value almost equivalent to those of the eutectic soldering alloys as well as an excellent melting point property. However, the inventors have further found another soldering alloy having excellent properties beyond the scope of the invention of Japanese Patent Application Laid-Open No. 8-187590, and thus the present invention has been made. In general, when the melting point property deteriorates, the soldering temperature must be set high, which has risks of thermally damaging the part to be soldered and shortening the product life.

SUMMARY OF THE INVENTION

From the above-described viewpoint, it is an object of the present invention to provide a soldering alloy which does not include harmful Pb or Cd and has an excellent tensile strength, elongation value, and melting point property, to thereby solve the conventional environmental problems and restrict thermal damages to the soldering portions by setting the soldering temperature at a low level, and prevent the damaging of the soldering alloy due to a heat cycle with the excellent tensile strength and elongation value.

In other words, according to the present invention, the tin-silver-based soldering alloy consists essentially of 3% to 4% by weight of Ag, 2% to 6% by weight of Bi, 2% to 6% by weight of In, and the balance being Sn. With this structure, the above-described problems can be solved.

DESCRIPTION OF THE PREFERRED EMBODIMENT

The present invention is based on an Sn an Ag 3.5% eutectic solder. Although an optimum volume of Ag to be added is 3.5%, Ag is added by 3% to 4% for the reason of the composition yield at the time of manufacturing a soldering alloy. When Bi is added by 2% or more, the melting point becomes 212° C. or lower, and if Bi is added in a amount exceeding 6%, the elongation value becomes less than 9%, which is lower than that of Alloy H. When In is added by 2% or more, the melting point becomes 212° C. or lower, but when In is added in an amount exceeding 6%, this is uneconomical because of the high cost of In.

An example of the present invention is shown below.

EXAMPLE

Sn, Ag, Bi, In, and Cu were weighed for a total weight of 10 Kg to have a composition shown in the composition table in Table 1, and the mixture was melted in an electric furnace in the atmosphere using a graphite crucible. The melting temperature was set at 300° C., and after each metal was completely molten, the mixture was stirred sufficiently to avoid gravity segregation. The molten alloy mixture was poured in a mold having inner dimensions of 150×60 mm and a height of 150 mm, with a mold thickness of 10 mm. From the lower part of the casting obtained, a JIS No. 4 test piece was taken and the tensile strength and elongation value thereof were measured according to a test method based on JIS Z2241. Test results are shown in Table 1. Similarly, a molton mixture of 10 Kg was allowed to cool and the melting point thereof was measured by a thermocouple-type thermometer. Results of this test are shown in Table 1. For comparison, properties of the Pb—Sn eutectic soldering alloy, Alloy H, and the soldering alloy disclosed in Japanese Patent Application Laid-Open No. 8-187590 were also tested in a similar manner, and the results thereof are shown in Table 1.

TABLE 1

|  | Chemical composition (% by weight) | | | | | Melting point (° C.) | Mechanical strength | |
|---|---|---|---|---|---|---|---|---|
|  | Ag | Bi | In | Cu | Sn |  | Tensile strength (kgf/mm$^2$) | Elongation value (%) |
| EX. | 3.5 | 3.0 | 6.0 | — | Bal. | 204 | 6.0 | 19 |
|  | 3.5 | 4.0 | 2.0 | — | Bal. | 211 | 5.7 | 22 |
|  | 3.5 | 4.0 | 3.0 | — | Bal. | 209 | 5.9 | 21 |
|  | 3.5 | 4.0 | 4.0 | — | Bal. | 207 | 6.1 | 20 |
|  | 3.5 | 4.0 | 5.0 | — | Bal. | 205 | 6.3 | 17 |
|  | 3.5 | 2.0 | 3.0 | — | Bal. | 212 | 5.0 | 29 |
|  | 3.5 | 6.0 | 3.0 | — | Bal. | 206 | 6.8 | 13 |
| CE. | 3.5 | 4.0 | 1.0 | — | Bal. | 213 | 5.5 | 24 |
|  | 3.5 | 1.0 | 3.0 | — | Bal. | 214 | 4.5 | 33 |
|  | 3.5 | 7.0 | 3.0 | — | Bal. | 204 | 7.3 | 9 |
|  | *2.0 | 7.5 | — | 0.5 | Bal. | 212 | 6.9 | 12 |
|  | Pb—Sn eutectic solder (Pb—63Sn) | | | | | 183 | 3.8 | 30 |

EX.: Example
CE.: Comparative Example
*: Alloy H

From Table 1, it is clear that the soldering alloy within the range of the composition of the present invention can have a tensile strength of 5.0 kgf/mm$^2$ or more and the elongation value of 13% or more, with the melting point 212° C. or lower, while none of the soldering alloys of the Comparative Examples could meet the overally properties of the alloys of the present invention.

According to the present invention, it is possible to obtain a soldering alloy which has mechanical properties such as tensile strength and elongation value, similar to those of the conventional Pb—Sn soldering alloys without including lead or cadmium which cause environmental pollution. Further, since a soldering alloy having an excellent melting point property equivalent to or higher than that of Alloy H can be obtained according to the present invention, it is possible to set the soldering temperature at a low level. Moreover, since this soldering alloy also has an excellent heat-resistance property, it is possible to absorb the thermal expansion difference between an IC substrate and parts even if a heat cycle is applied, so that damaging of a product can be minimized.

What is claimed is:

1. A tin-silver-based soldering alloy consisting essentially of 3 to 4 wt. % Ag, 3 to 6 wt. % Bi, 2 to 6 wt. % In and the balance being Sn.
2. A tin-silver-based soldering alloy consisting essentially of 3 to 4 wt. % Ag, 2 to 6 wt. % Bi, 5 to 6 wt. % In and the balance being Sn.
3. A tin-silver-based soldering alloy consisting essentially of 4 wt. % Ag, 2 to 6 wt. % Bi, 3 to 6 wt. % In and the balance being Sn.
4. The tin-silver-based soldering alloy of claim 1, consisting essentially of 3.5 wt. % Ag, 3 wt. % Bi, 6 wt. % In and the balance being Sn.
5. The tin-silver-based soldering alloy of claim 1, consisting essentially of 3.5 wt. % Ag, 4 wt. % Bi, 2 wt. % In and the balance being Sn.
6. The tin-silver-based soldering alloy of claim 1, consisting essentially of 3.5 wt. % Ag, 4 wt. % Bi, 3 wt. % In and the balance being Sn.
7. The tin-silver-based soldering alloy of claim 1, consisting essentially of 3.5 wt. % Ag, 4 wt. % Bi, 4 wt. % In and the balance being Sn.
8. The tin-silver-based soldering alloy of claim 1, consisting essentially of 3.5 wt. % Ag, 4 wt. % Bi, 5 wt. % In and the balance being Sn.
9. The tin-silver-based soldering alloy of claim 1, consisting essentially of 3.5 wt. % Ag, 6 wt. % Bi, 3 wt. % In and the balance being Sn.
10. A tin-silver-based soldering alloy consisting essentially of 3.5 wt. % Ag, 2 wt. % Bi, 3 wt. % In and the balance being Sn.

* * * * *